US007694991B2

(12) United States Patent
Mills et al.

(10) Patent No.: US 7,694,991 B2
(45) Date of Patent: Apr. 13, 2010

(54) MOTORIZED SCOOTER WHEELCHAIR ATTACHMENT DEVICE

(76) Inventors: Daniel Mills, 73 E. Shore Lake Owassa Rd., Newton, NJ (US) 07860; Larry Mills, 73 E. Shore Lake Owassa Rd., Newton, NJ (US) 07860

( * ) Notice: Subject to any disclaimer, the term of this patent is extended or adjusted under 35 U.S.C. 154(b) by 325 days.

(21) Appl. No.: 11/934,419

(22) Filed: Nov. 2, 2007

(65) Prior Publication Data

US 2008/0197598 A1 Aug. 21, 2008

Related U.S. Application Data

(63) Continuation-in-part of application No. 10/919,996, filed on Aug. 17, 2004, now Pat. No. 7,306,250.

(51) Int. Cl.
*A61G 5/10* (2006.01)
*B62M 7/14* (2006.01)

(52) U.S. Cl. .................. 280/304.1; 280/250.1; 180/11; 180/12; 180/13; 180/15; 180/16

(58) Field of Classification Search .............. 280/304.1, 280/250.1; 180/11, 12, 13, 15, 16
See application file for complete search history.

(56) References Cited

U.S. PATENT DOCUMENTS 6,860,347 B2 * 3/2005 Sinclair et al. ................ 180/11
7,216,728 B2 * 5/2007 Huang et al. .................. 180/13
2003/0000748 A1 * 1/2003 McHardy et al. .............. 180/13
2003/0012617 A1 * 1/2003 Constantin ..................... 410/7
2004/0000440 A1 * 1/2004 Sawyer ........................ 180/13

* cited by examiner

*Primary Examiner*—Lesley Morris
*Assistant Examiner*—Marlon A Arce
(74) *Attorney, Agent, or Firm*—Steven B. Stein

(57) ABSTRACT

The present invention provides a kit for attaching a manually operated wheelchair to a motorized scooter having a seating apparatus and supporting structure and a floor, comprising: (a) a motorized scooter attachment angle iron, wherein the angle iron comprises: (i) a vertical wall; and (ii) a horizontal wall, the horizontal wall forming approximately a right angle to the vertical wall, wherein the horizontal wall has at least two embedded elongated slots; (b) an angle iron attachment adjustable bar, wherein the adjustable bar comprises (i) a left elbow shaped tubular segment having a horizontally oriented bottom end and a vertically oriented top end; (ii) a right elbow shaped tubular segment having a horizontally oriented bottom end and a vertically oriented top end; and (iii) a straight middle tubular segment having a diameter larger than the left segment and the right segment, so as to permit the left segment to insert into a left end of the middle tubular segment and so as to permit the right segment to insert into a right end of the middle tubular segment; and (c) a pair of tubular adapters, wherein each adapter comprises (i) an elbow connecting bottom end, capable of attaching to the vertically oriented top end; and (ii) a concave top end, wherein the concave top end is generally perpendicular to the elbow connecting bottom end and wherein the concave top end is open on top.

20 Claims, 6 Drawing Sheets

18
218

18
218

18
218
318
319

25
214

519
518
18
218

518
34
216
214
215

MOTORIZED SCOOTER WHEELCHAIR ATTACHMENT DEVICE

The present application is a continuation-in-part application and claims priority to U.S. application Ser. No. 10/919,996 filed on Aug. 17, 2004, which is hereby incorporated by reference in its entirety.

Throughout this application, various publications are referenced. Full citations for these publications may be found within the Specification or listed at the end of the specification and preceding the Claims. The disclosures of these publications in their entireties are hereby incorporated by reference into this application in order to more fully describe the state of the art.

BACKGROUND OF THE INVENTION

The invention generally relates to wheelchairs, and in particular it relates to a device for securely attaching a manually operated wheelchair to a motorized scooter.

Americans are living longer now than ever before thanks to medical technological advances and increased health awareness. As the population grows older, more and more people are experiencing the often cruel ravages inflicted by the aging process. Senior citizens often suffer from varying degrees of impaired mobility and consequently experience difficulties in getting around. Moreover, impaired mobility is not limited to the elderly. To the contrary, many individuals from all age groups cope with this phenomenon every day on a temporary or permanent basis. These people are routinely confronted with numerous problems that cannot be envisioned, much less fully understood, by the majority of the population that is fortunate enough to have all of their physical faculties intact. Fortunately, manually operated and mechanized wheelchairs are commercially available to those in need.

Manually operated wheelchairs are significantly less expensive than their motorized counterparts and are consequently in much wider use. An elderly or disabled consumer can purchase a manually operated wheelchair for a few hundred dollars but must spend about six thousand to seven thousand dollars to acquire a motorized version. However, certain disadvantages are typically associated with utilizing manually operated wheelchairs. Most notably, the user must expend a lot of physical effort rotating the outside wheels of the device in order to travel from one location to another. Thus, the user generally becomes tired and weary in a relatively short period of time. The user often requires another person to push the wheelchair in which he sits to complete long excursions, an untenable or at least uncomfortable predicament. Hence, there is a pressing need for a method of effectively converting a manually operated wheelchair to an affordable motorized wheelchair by securely attaching it to a scooter. U.S. Pat. No. 3,921,744 to Benoit et al. ("Benoit") teaches a wheelchair with a detachable drive means. However, a user must exert considerable energy attaching and detaching the drive means to the wheelchair of Benoit. U.S. Pat. No. 4,386,672 to Coker ("Coker") discloses battery-powered electric drive unit that detachably connects to a conventional wheelchair. However, the drive unit of Coker is highly complex and has little practical utility. U.S. Pat. No. 4,892,166 to Gaffney ("Gaffney") teaches a device for coupling a front wheel unit of a motorized wheelchair with a rear wheel unit to obtain an assembled motorized wheelchair. However, the device of Gaffney is useless with manually operated wheelchairs. U.S. Pat. No. 5,050,695 to Kleinwolterink ("Kleinwolterink") discloses a unit that is adapted to easily attach to a conventional wheelchair and convert it to a motorized wheelchair. However, the unit of Kleinwolterink is excessively bulky and very cumbersome. U.S. Pat. No. 5,494,126 to Meeker ("Meeker") teaches an apparatus and method for attaching a motorized wheel to a manually operated wheelchair. However, the apparatus and method of Meeker are extraordinarily complex and impractical. U.S. Pat. No. 5,826,670 to Nan ("Nan") discloses a detachable propulsive device for a wheelchair. However, the device of Nan does not provide an area in which the user can rest his feet while riding. U.S. Pat. No. 6,231,283 B1 to Stowers ("Stowers") teaches an apparatus that anchors a vehicle such as a wheelchair in place. However, the apparatus of Stowers does not transport a wheelchair user from one location to another.

While these devices may be suitable for the particular purposes employed, or for general use, they would not be as suitable for the purposes of the present invention as disclosed hereafter.

SUMMARY OF THE INVENTION

The present invention provides a kit for attaching a manually operated wheelchair to a motorized scooter having a seating apparatus and supporting structure and a floor, comprising: (a) a motorized scooter attachment angle iron, wherein the angle iron comprises: (i) a vertical wall; and (ii) a horizontal wall, the horizontal wall forming approximately a right angle to the vertical wall, wherein the horizontal wall has at least two embedded elongated slots; (b) an angle iron attachment adjustable bar, wherein the adjustable bar comprises (i) a left elbow shaped tubular segment having a horizontally oriented bottom end and a vertically oriented top end.; (ii) a right elbow shaped tubular segment having a horizontally oriented bottom end and a vertically oriented top end; and (iii) a straight middle tubular segment having a diameter larger than the left segment and the right segment, so as to permit the left segment to insert into a left end of the middle tubular segment and so as to permit the right segment to insert into a right end of the middle tubular segment; and (c) a pair of tubular adapters, wherein each adapter comprises (i) an elbow connecting bottom end, capable of attaching to the vertically oriented top end; and (ii) a concave top end, wherein the concave top end is generally perpendicular to the elbow connecting bottom end and wherein the concave top end is open on top.

It is an object of the invention to provide a kit that facilitates that involves means which securely attach a motorized scooter to a manually operated wheelchair. Accordingly, the kit provides uses a pair of adapters positioned at opposite ends of a U-shaped adjustable bar to fasten the bar to the underside of the wheelchair.

It is another object of the invention to provide a means to anchor the bar in place. Accordingly, the method uses a 90° angle iron that is located below the bar and fastened to the floor of a scooter with fasteners such as bolt-and-nut combinations.

It is a further object of the invention to provide a means to keep the cross braces of the wheelchair even during use. Accordingly, a circular, self-adhesive rubber bumper is provided which can be attached to the scooter.

The present invention provides a kit for attaching a manually operated wheelchair to a motorized scooter using an angle iron, an adjustable bar that has a left segment, a middle segment, a right segment and a pair of adapters. A user slides the middle segment over the left and right segments, and inserts screws into left and right holes in the middle segment and aligned holes in the left and right segments. The user then screws the adapters onto upper ends of the le and right segments and snaps them into position on the underside of the wheelchair. Next, the user removes the seating apparatus from the scooter, fastens the angle iron the floor of the scooter by inserting a pair of bolts through the slots in the angle iron and tightening the bolts with a pair of matching nuts, and places the bar squarely against the angle iron.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described a follows.

FIG. 2A is a diagrammatic perspective view of the adjustable bar of the present invention. FIGS. 2B-2G are diagrammatic views of alternative embodiments of components of the adjustable bar.

FIG. 3A is a diagrammatic perspective view of the adjustable bar in a locked position. FIGS. 3B-3G are diagrammatic views of alternative embodiments of components of the present invention showing the angle iron for positioning of the adjustable bar. FIGS. 3H-3I are diagrammatic views of alternative embodiments of the present invention showing the attachment of the adjustment bar to the wheelchair. FIG. 3J-K are diagrammatic perspective views of alternative embodiments of the angle iron.

DETAILED DESCRIPTION

Figure 1:
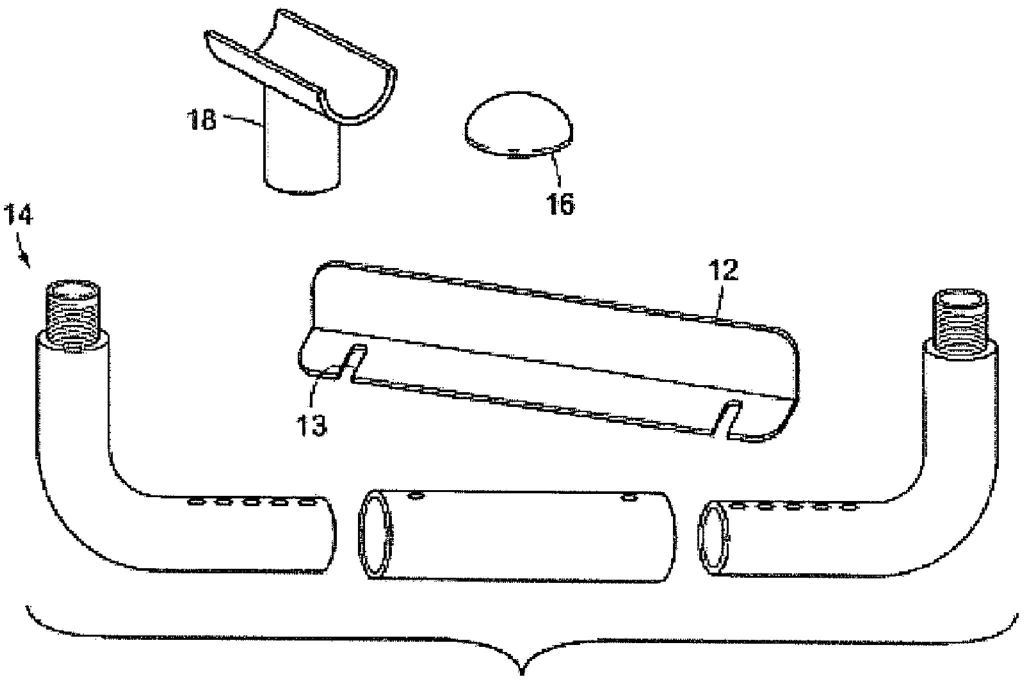
FIG. 1 is a diagrammatic perspective view of the mechanical components provided in the kit of the present invention.

The present invention provides a kit for attaching a manually operated wheelchair to a motorized scooter having a seating apparatus and supporting structure and a floor, comprising: (a) a motorized scooter attachment angle iron, wherein the angle iron comprises: (i) a vertical wall; and (ii) a horizontal wall, the horizontal wall forming approximately a right angle to the vertical wall, wherein the horizontal wall has at least two embedded elongated slots; (b) an angle iron attachment adjustable bar, wherein the adjustable bar comprises (i) a left elbow shaped tubular segment having a horizontally oriented bottom end and a vertically oriented top end.; (ii) a right elbow shaped tubular segment having a horizontally oriented bottom end and a vertically oriented top end; and (iii) a straight middle tubular segment having a diameter larger than the left segment and the right segment, so as to permit the left segment to insert into a left end of the middle tubular segment and so as to permit the right segment to insert into a right end of the middle tubular segment; and (c) a pair of tubular adapters, wherein each adapter comprises (i) an elbow connecting bottom end, capable of attaching to the vertically oriented top end; and (ii) a concave top end, wherein the concave top end is generally perpendicular to the elbow connecting bottom end and wherein the concave top end is open on top.

According to one embodiment of the invention, the left segment further comprises a plurality of linearly positioned holes embedded therein. According to another embodiment of this invention, the right segment further comprises a plurality of linearly positioned holes embedded therein. According to still another embodiment, the middle segment further comprises a plurality of linearly positioned holes embedded therein. It is specifically contemplated that the provided holes will accommodate fasteners for securing the elbow shaped tubular segments to the middle segment. It is further contemplated that the provided holes will accommodate fasteners for securing the elbow shaped tubular segments to the adaptors. Fasteners are well known in the art and may include for example, nuts and bolts, screws, pins, rivets, and ties. According to another embodiment of this invention, the elbow shaped tubular segment vertically oriented top end is threaded. According to still another embodiment, the adapter elbow connecting bottom end is threaded. Alternatively, the adapter may further comprise a plurality of holes suitable for aligning with the elbow segment holes so that the adapter may be joined to the segment using a fastener means. According to another alternative embodiment of this invention, a portion of the elbow shaped tubular segment vertically oriented top end is reduced in diameter so as to removably be insertable into the adapter elbow connecting bottom end. According to still another alternative embodiment of this invention, a portion of the adapter elbow connecting bottom end is reduced in diameter so as to removably be insertable into the elbow shaped tubular segment vertically oriented top end. According to another embodiment of the present invention, the kit further comprises an attachable bumper. According to one embodiment of this invention, the bumper is capable of cushioning shock. According to one embodiment of this invention, the bumper is comprised of rubber. According to another embodiment, the bumper is comprised of plastic. It is specifically contemplated that the bumper may be comprised of any shock absorbing material including but not limited to synthetic or natural material, wood and cork. According to another embodiment of the present invention, a shock absorber means is provided. It is contemplated that a shock absorber means may include but not be limited to a solid device, a hollow device, and a mechanical device such as a spring, fluid filled vessel, gas filled vessel. The shock absorber means is contemplated as dampening vibration transmission between the scooter and the wheelchair. The shock absorber means may be integrated into at least one of the segments of the adjustable bar. According to another embodiment, the shock absorber means may be integrated into at least one of the adapters. The present invention further provides a plurality of fastener means suitable for attaching the various components of the kit as described herein and illustrated throughout. The present invention contemplates that such fastening means are capable of reversibly attaching the components so as to facilitate assembly as well as disassembly. According to one embodiment, the fastening means facilitate attachment of the angle iron to the floor of a motorized scooter. According to still a further embodiment of the present invention the adapter further comprises a concave clamp, wherein the concave clamp is capable of attaching to the adaptor concave open top end, thereby forming a generally tubular enclosure. According to still another embodiment, the elbow shaped tubular segment vertically oriented top end further comprises an adaptor attachment hole. It is specifically contemplated that the adaptor attachment hole is capable of accepting a fastening means therethrough. According to yet still a further embodiment of this invention, the adapter elbow connecting bottom end further comprises an elbow shaped tubular segment vertically oriented top end attachment hole. It is specifically contemplated that the elbow shaped tubular segment vertically oriented top end attachment hole is capable of accepting a fastening means therethrough. It is further contemplated that the attachment hole and the elbow shaped tubular segment vertically oriented top end attachment hole can be aligned and fastened together using a fastening means. According to yet still a further embodiment of the invention, the angle iron further comprises a second vertical wall, thereby forming a generally U-shaped horizontal channel capable of accommodating the diameter of the straight middle tubular segment of the adjustable bar. According to such an embodiment, the angle iron is capable of more securely positioning the bar. According to another embodiment of this invention, the angle iron further comprises a fold over top horizontal wall capable of enclosing the U-shaped channel. According to such an embodiment the bar is locked into position in the channel. According to still a further embodiment, the angle iron further comprises a fastening means for securely fastening the fold over top to the angle iron. According to another embodiment of the present invention, the angle iron has a vertical elevation with respect to the vertical placement of the adjustable bar. According to yet another embodiment of the invention, the kit is further comprising a manual wheelchair. According to still yet another embodiment, the kit further comprises a motorized scooter.

Figure 2A:
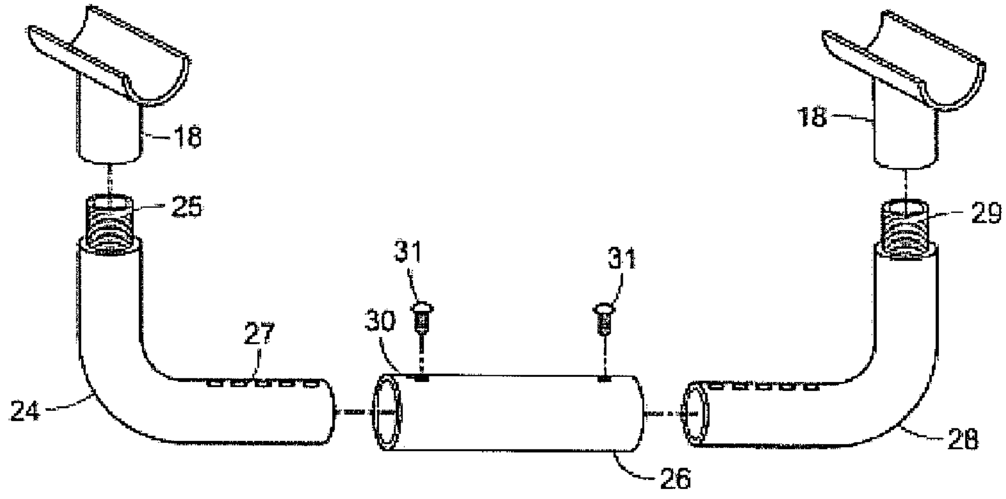
FIGS. 2A-2G.
Figure 3A:
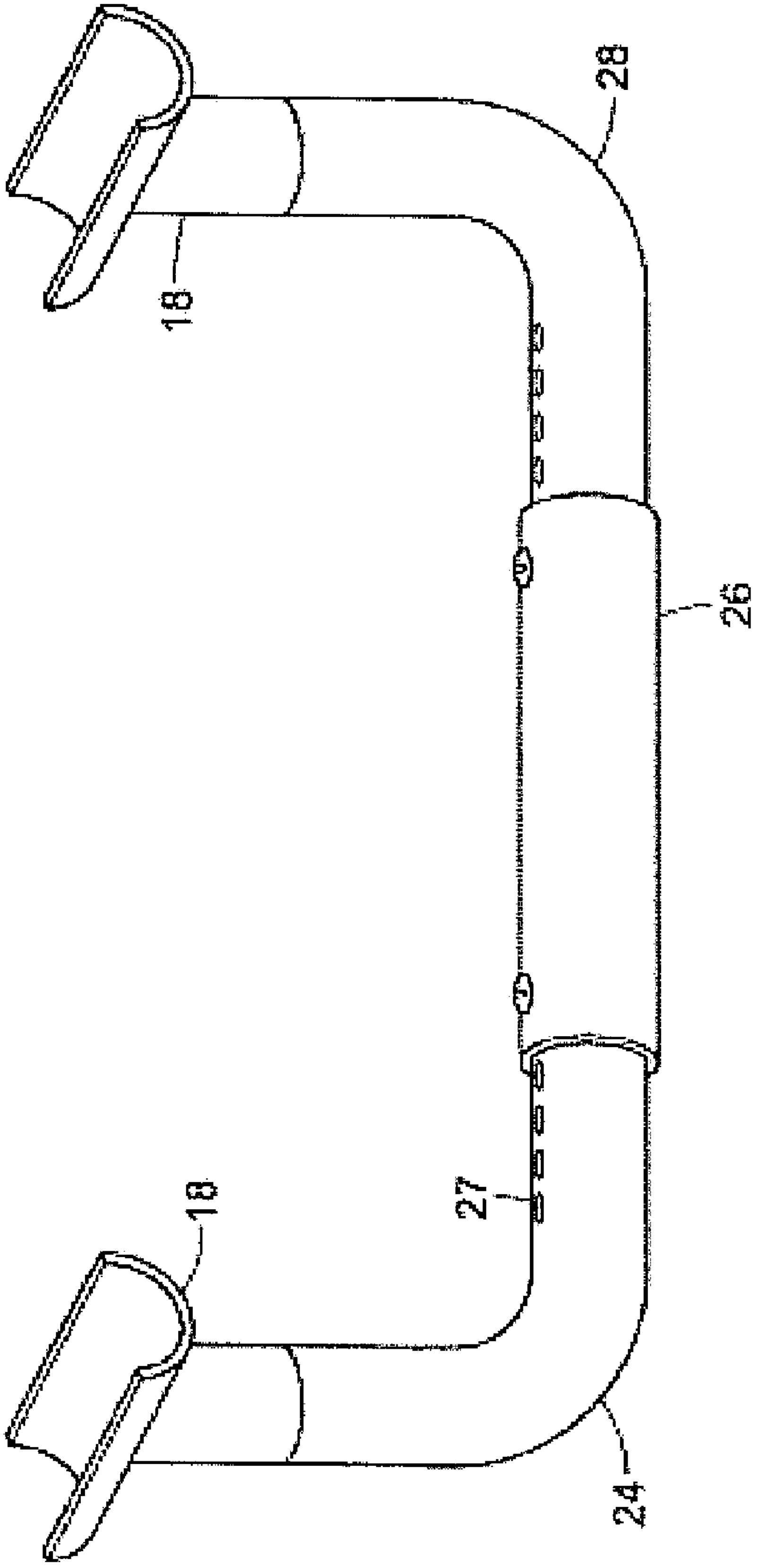
FIGS. 3A-3K.

Turning now to the figures, FIG. 1 depicts the mechanical components that are used in the steps of the method of the present invention. The components include a 90° angle iron 12 with a pair of elongated slots 13 embedded therein, a U-shaped adjustably bar 14, a circular, self-adhesive rubber bumper 16 and an adapter 18 that has a concave-up orientation. As shown is FIG. 2A and FIG. 3A, the bar 14 consists of an L-shaped left segment 24 with an upper end 25, a symmetric right segment with an upper end 29 and a straight middle segment 26 that has a slightly larger diameter than the left segment 24 and the right segment 28. A plurality of linearly positioned threaded holes 27 is embedded in corresponding areas of the left segment 24 and the right segment 28. The middle segment 26 has left and right holes 30.

Figure 4:
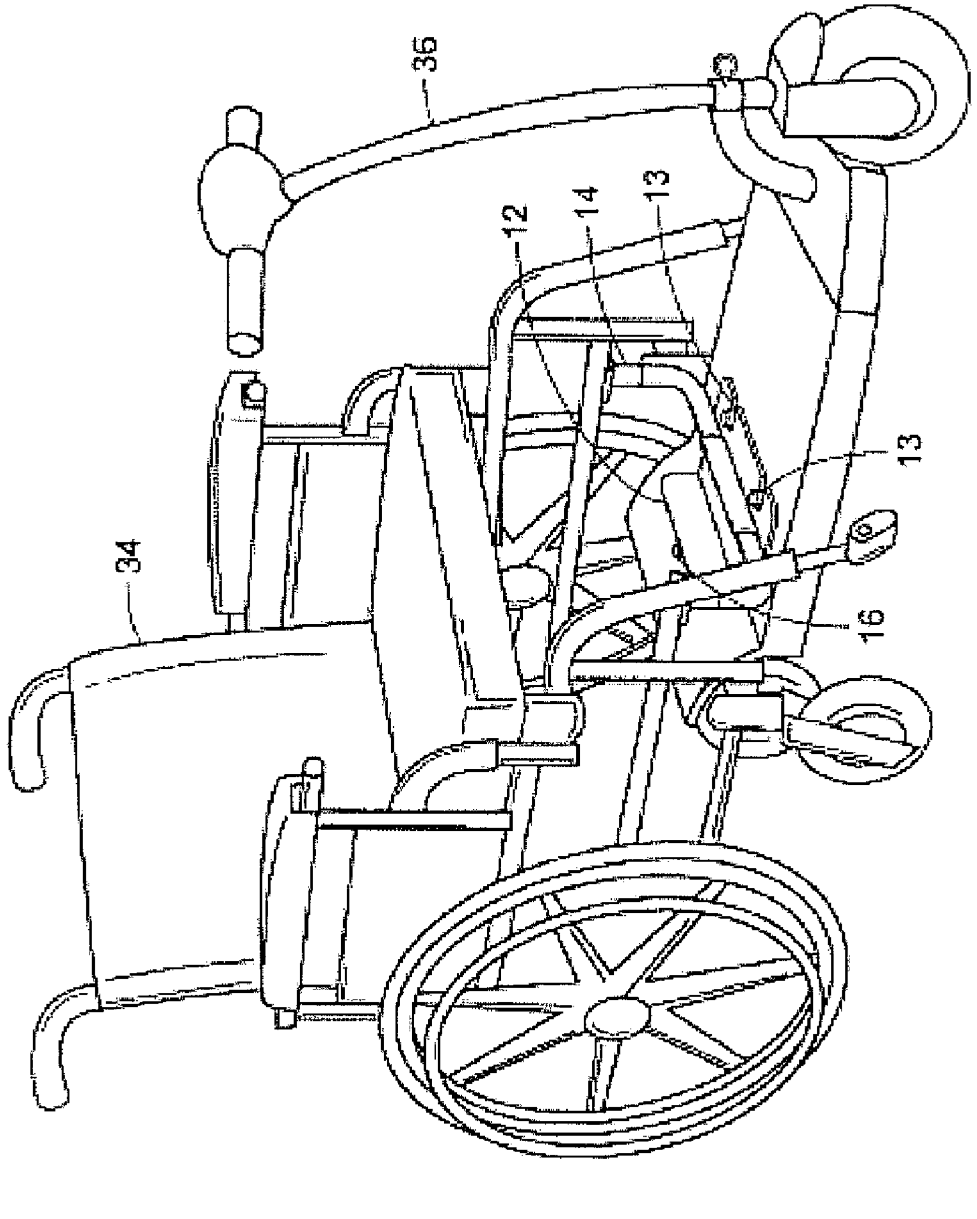
FIG. 4 is a diagrammatic perspective view of a manually operated wheelchair mounted onto a motorized scooter according to the present invention.

According to the present invention, a user telescopically slides the middle segment 26 over the left segment 24 and the right segment 28 until the width of the bar 14 is substantially equal to the width of a manually operated wheelchair 34. The user then inserts two screws 31 into the left and right holes 30 in the middle segment 26 and the nearest aligned holes in the left segment 24 and the right segment 28. In order to attach the bar 14 to the wheelchair 34, the user screws an adapter 18 onto the upper end 25 of the left segment 24 and the upper end 29 of the right segment 28. The user firmly snaps the adapters 18 into position on the underside of the wheelchair 34. Next, the user removes the seating apparatus and supporting structure from a motorized scooter 36. The user fastens the angle iron 12 to the floor of the scooter by inserting a pair of bolts through the slots 13 and tightening them with a pair of matching nuts. As illustrated in FIG. 4, in order to mount the wheelchair 34 onto the floor of the scooter 36, the user places the bar 14 squarely against the vertical wall of the angle iron 12. The user attaches the bumper 16 to the scooter 36 in order to keep the cross braces of the wheelchair 34 even during use. The user can then sit in the wheelchair 34, rest his feet on the floor of the scooter 36 and fully enjoy the significant benefits of traveling in a converted motorized wheelchair. If the user subsequently wishes to again utilize the wheelchair 34 separately, he then disassembles the wheelchair 34/scooter 36 combination. To do so, he first detaches the adapters 18 from the underside of the wheelchair 34 by snapping them free. He then loosens the bolt-and-nut combinations in the slots-13 and lifts the angle iron 12 from the floor of the scooter 36. If the user decides that he prefers to operate the wheelchair 34 manually, he can reinstall the seating apparatus and supporting structure on the scooter 36. He can also disassemble the bar 14 by unscrewing the adapters 18 from the upper end 25 of the left segment 24 and from the upper end 29 of the right segment 28, removing the screws 31 from the left and right holes 30 in the middle segment 26 and sliding the left segment 24 and the right segment 28 out of the middle segment 26.

Figure 2B:
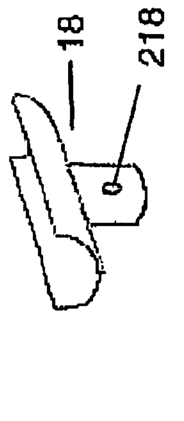
Figure 2C:
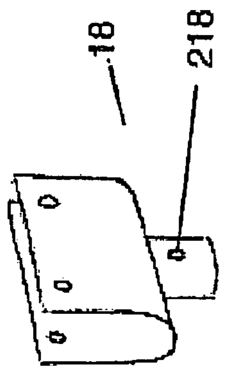
Figure 2D:
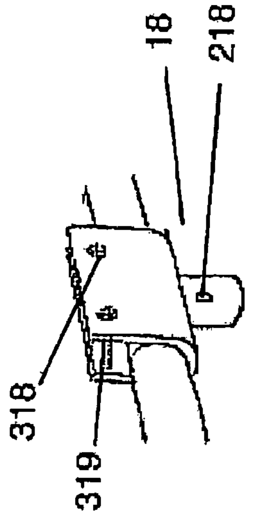
Figure 2E:
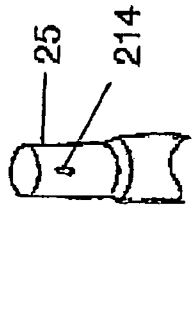
Figure 2F:
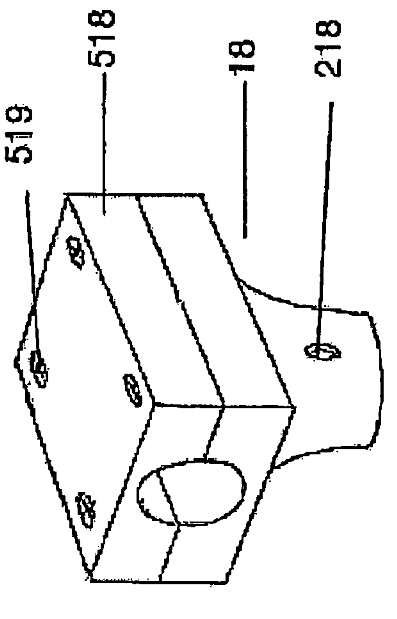
Figure 2G:
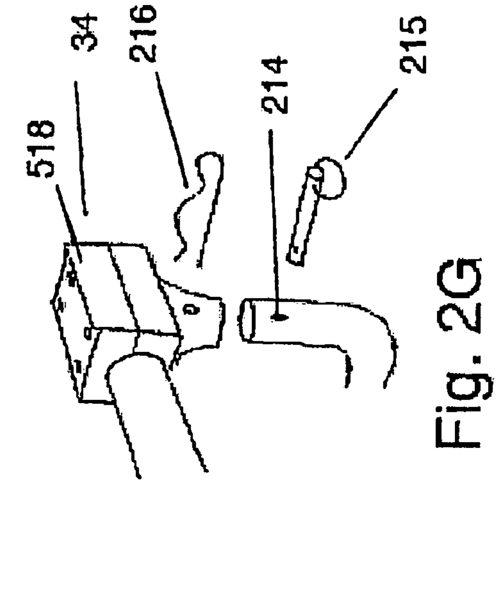
Figure 3D:
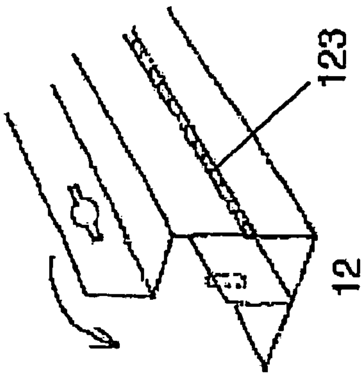
Figure 3C:
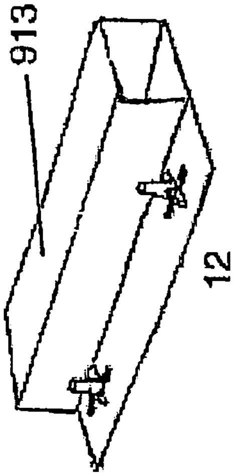
Figure 3B:
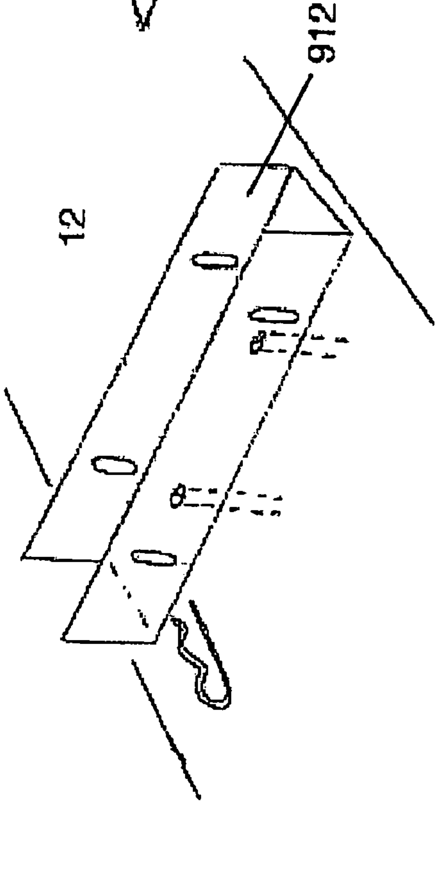
Figure 3G:
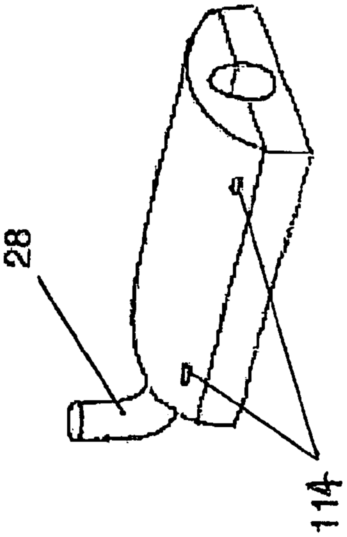
Figure 3F:
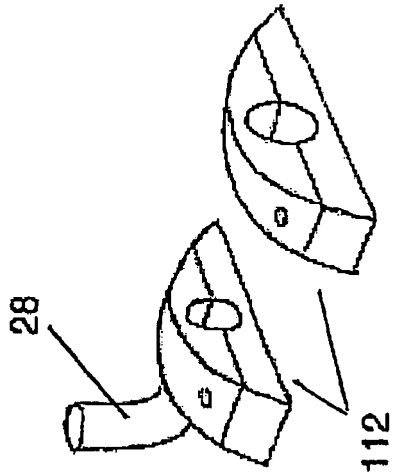
Figure 3E:
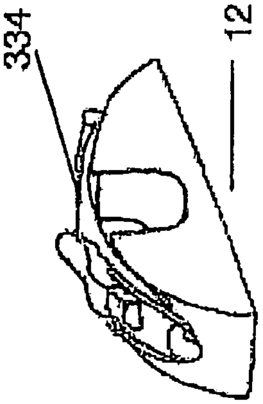
Figure 3I:
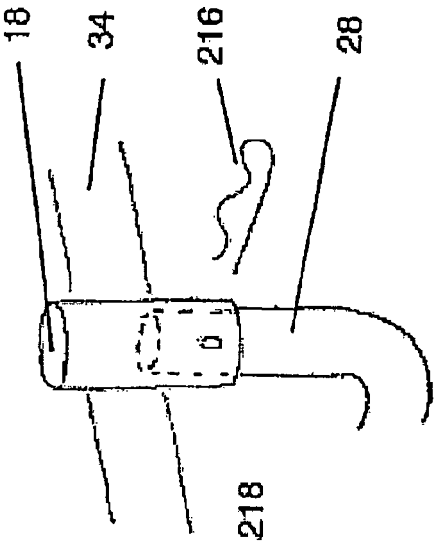
Figure 3K:
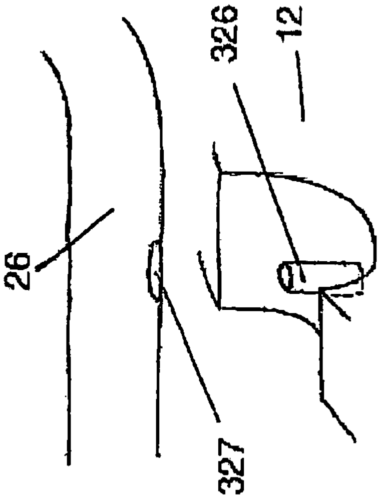
Figure 3H:
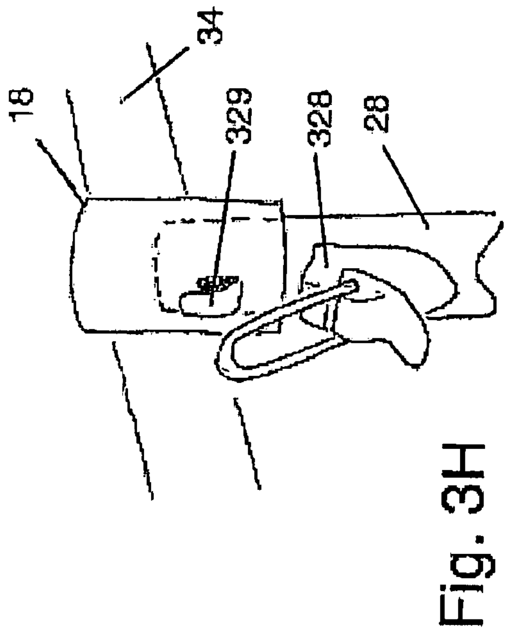
Figure 3J:
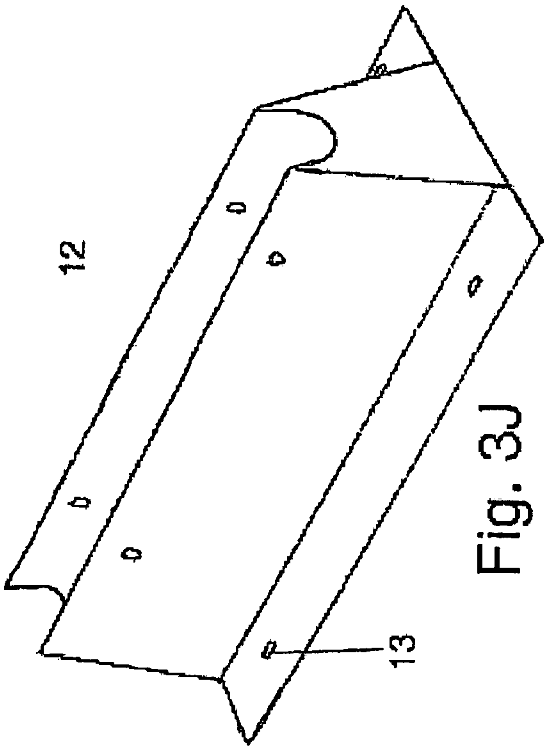

The present invention contemplates alternative embodiments of various components as shown in FIGS. 2B-2G and FIGS. 3B-3K. FIG. 2B shows the adapter 18 with a hole 218 capable of aligning with a hole 214 on the upper end 25 of the left segment 24 as shown in FIG. 2E, which can be removably secured with a fastening means such as exemplified by 214 and 215. Another alternative embodiment of the adaptor 18 shown in FIG. 2C and FIG. 2D shows a plurality of security holes 318, through which can be reversibly inserted fastenings means such as exemplified by 319 in order to stably attach the adaptor 18 to the wheelchair 34. Yet another alternative shown in FIG. 2F and FIG. 2G show an adaptor cap 518 which can be secured by fastening means such as exemplified by 519. FIG. 3B shows an alternative embodiment of the angle iron 12 having a second vertical wall 912, thereby forming a generally U-shaped horizontal channel capable of accommodating the diameter of the straight middle tubular segment 26 of the adjustable bar 14. The alternative of FIG. 3C shows the angle iron 12 having a top enclosure 913. The alternatives of FIG. 3D and FIG. 3E show the angle iron 12 wherein the top enclosure can be folded into an open and closed position by use of a folding means such as exemplified by a hinge 123 and pivoting strap 334. The alternative of FIG. 3G shows that a top enclosure 913 can be reversibly secured with fastening means using a plurality of securing holes 114. The alternative of FIG. 3F shows the use of a plurality of angle irons 112. The alternative of FIG. 3H and FIG. I. show alternative embodiments facilitating attachment of the adaptor 18 to the vertical segment 28 using fastening means such as exemplified by a clasp 328 and hook 329 in FIG. 3H and pin 216 in FIG. 3I. FIG. 3J and FIG. 3K show alternative embodiments of the angle iron 12. FIG. 3J shows a vertically raised angle iron 12 channel suitable for vertically adjusting the level of the adjustment bar. The alternative embodiment of FIG. 3I shows the angle iron 12 having a position securing pin 326 capable of reversibly inserting into a position securing hole 327 on the adjustment bar 14 thereby limiting horizontal sliding of the adjustment bar 14 relative to the angle iron 12. According to another alternative embodiment of this invention, a pin downwardly protruding from the adjustment bar 14, capable of reversibly inserting into a corresponding hole in the angle iron 12, thereby limiting horizontal sliding of the adjustment bar 14 relative to the angle iron 12.

The present invention provides a kit for attaching a manually operated wheelchair to a motorized scooter. The invention is illustrated by example in the drawing figures, and throughout the written description. It should be understood that numerous variations are possible, while adhering to the inventive concept. Such variations are contemplated as being a part of the present invention. Thus, the descriptions, examples and embodiments described herein are presented in order to more fully illustrate preferred embodiments of the invention. They should in no way be construed, however, as limiting the broad scope of the invention. While the invention is described and illustrated herein by references to various specific material, procedures and examples, it is understood that the invention is not restricted to the particular material combinations of material, and procedures selected for that purpose. Numerous variations of such details can be implied as will be appreciated by those skilled in the art.

What is claimed is:

1. A kit for attaching a manually operated wheelchair to a motorized scooter having a seating apparatus and supporting structure and a floor, comprising:

a. A motorized scooter attachment angle iron, wherein the angle iron comprises:

i. a vertical wall; and ii. a horizontal wall, the horizontal wall forming approximately a right angle to the vertical wall, wherein the horizontal wall has at least two embedded elongated slots;

b. an angle iron attachment adjustable bar, wherein the adjustable bar comprises i. a left elbow shaped tubular segment having a horizontally oriented bottom end and a vertically oriented top end;

ii. a right elbow shaped tubular segment having a horizontally oriented bottom end and a vertically oriented top end; and iii. a straight middle tubular segment having a diameter larger than the left segment and the right segment, so as to permit the left segment to insert into a left end of the middle tubular segment and so as to permit the right segment to insert into a right end of the middle tubular segment.

c. A pair of tubular adapters, wherein each adapter comprises i. An elbow connecting bottom end, capable of attaching to the vertically oriented top end; and ii. A concave top end, wherein the concave top end is generally perpendicular to the elbow connecting bottom end and wherein the concave top end is open on top.

2. The kit of claim 1, wherein the left segment further comprises a plurality of linearly positioned holes embedded therein.

3. The kit of claim 1, wherein the right segment further comprises a plurality of linearly positioned holes embedded therein.

4. The kit of claim 1, wherein the middle segment further comprises a plurality of linearly positioned holes embedded therein.

5. The kit of claim 1, wherein the elbow shaped tubular segment vertically oriented top end is threaded.

6. The kit of claim 1, wherein the adapter elbow connecting bottom end is threaded.

7. The kit of claim 1, further comprising an attachable bumper.

8. The bumper of claim 7, wherein the bumper is comprised of rubber.

9. The kit of claim 1, wherein the angle iron further comprises a position securing pin.

10. The kit of claim 1, further comprising a plurality of fasteners capable of reversibly attaching the angle iron to the floor of a motorized scooter.

11. The fasteners of claim 10, wherein the fasteners comprise bolts.

12. The kit of claim 1, wherein the adapter further comprises a concave clamp, wherein the concave clamp is capable of attaching to the adaptor concave open top end, thereby forming a generally tubular enclosure.

13. The kit of claim 1, further comprising a manual wheelchair.

14. The kit of claim 1, further comprising a motorized scooter.

15. The kit of claim 1, wherein the elbow shaped tubular segment vertically oriented top end further comprises an adaptor attachment hole capable of accepting a fastening means therethrough.

16. The kit of claim 15, wherein the adapter elbow connecting bottom end further comprises an elbow shaped tubular segment vertically oriented top end attachment hole capable of accepting a fastening means therethrough in alignment with the adaptor attachment hole.

17. The kit of claim 1, further comprising a shock absorber means capable of being positioned between the wheelchair and the motorized scooter.

18. The kit of claim 1, wherein the angle iron further comprises a second vertical wall, thereby forming a generally U-shaped horizontal channel capable of accommodating the diameter of the straight middle tubular segment of the adjustable bar.

19. The kit of claim 18, wherein the angle iron further comprises a fold over top horizontal wall capable of enclosing the U-shaped channel.

20. The kit of claim 19, wherein the angle iron further comprises a fastening means for securely fastening the fold over top to the angle iron.

* * * * *